United States Patent [19]

Rosenbaum

[11] Patent Number: 4,534,955
[45] Date of Patent: Aug. 13, 1985

[54] SULFUR EXTRACTION PROCESS

[75] Inventor: John M. Rosenbaum, Albany, Calif.

[73] Assignee: Chevron Research Company, San Francisco, Calif.

[21] Appl. No.: 510,379

[22] Filed: Jul. 1, 1983

[51] Int. Cl.³ ............................................. C01B 17/05
[52] U.S. Cl. ............................. 423/573 R; 23/293 S; 210/704; 423/224; 423/226
[58] Field of Search ............... 423/224, 226, 234, 571, 423/573 R, 573 G, 658.5; 210/703, 704, 705, 706; 23/293 S

[56] References Cited

U.S. PATENT DOCUMENTS

| | | |
|---|---|---|
| 1,802,580 | 4/1931 | Seil . |
| 1,866,229 | 7/1932 | Sperr, Jr. .............................. 423/234 |
| 2,772,146 | 11/1956 | Pippig .............................. 423/573 R |
| 2,793,185 | 5/1957 | Albrektsson et al. . |
| 3,725,264 | 4/1973 | Wheeler .............................. 423/571 |
| 3,904,734 | 9/1975 | Gosden et al. ...................... 423/236 |
| 3,959,452 | 5/1976 | Espenscheid et al. ......... 423/573 G |
| 3,972,989 | 8/1976 | Fenton et al. ....................... 423/226 |
| 3,983,225 | 9/1976 | Van Brocklin et al. ........ 423/574 R |
| 4,002,728 | 1/1977 | DeMay .............................. 423/578 R |
| 4,207,185 | 6/1980 | Hinds ................................... 210/44 |
| 4,283,379 | 8/1981 | Fenton et al. ....................... 423/571 |
| 4,338,192 | 7/1982 | Krasnoff et al. ................. 210/221.2 |

OTHER PUBLICATIONS

"Dissolved Air Flotation for Solid/Liquid Separation", Rees et al., J. Separ. Proc. Technol., 1(3), 19–23, (1980).
"Dissolved Air Flotation", Bulletin No. KSB 123-8106 of Komline-Sanderson.
*Handbook of Separation Techniques for Chemical Engineers*, Schweitzer, pp. 4-121,122, 4-127,128,129.

Primary Examiner—John Doll
Assistant Examiner—Jeffrey E. Russel
Attorney, Agent, or Firm—Burns, Doane, Swecker & Mathis

[57] ABSTRACT

An improved solid-liquid separation step for use in connection with the Stretford process introduces a small amount of an additive which is then emulsified and mechanically treated in a colloid mill or processed through an air dissolver before introduction into a flotation cell. The process uses dissolved air and/or dispersed air to float the elemental sulfur while simultaneously regenerating the Stretford solution for recirculation.

5 Claims, 6 Drawing Figures

SULFUR EXTRACTION PROCESS

The present invention relates generally to the Stretford process (sometimes called the Bevon's Sulfur Removal Process) of removing hydrogen sulfide from a gas stream and recovering elemental sulfur as a by-product. More particularly, the present invention concerns an impovement to the solid-liquid separation step by which the solid elemental sulfur is removed from the liquid Stretford solution.

Hydrogen sulfide is a noxious gas which is commonly found in considerable concentrations in sour natural gas and in tail gases from petroleum refineries. The noxiousness of the hydrogen sulfide is manifested in a number of ways. For example, an offensive odor is detectable when hydrogen sulfide is present in quantities as low as 0.13 ppm by volume. In addition a mixture of hydrogen sulfide and air is explosive when the hydrogen sulfide is present in concentrations as low as 4.4 volume percent. Moreover, hydrogen sulfide is a dangerous mammalean poison.

The noxious character of the hydrogen sulfide has led to state and federal laws and regulations that severely restrict the quantities of hydrogen sulfide that may be permissibly exhaust into the atmosphere. In at least partial response to these regulations, numerous processes have been developed to remove hydrogen sulfide from residue gases as well as from otherwise useful products such as natural gas. One of the prominent processes in the petroleum industry for effecting the hydrogen sulfide removal is known as the Stretford process. The Stretford process is generally described in three United States Patents issued to T. Nicklin et al, U.S. Pat. No. 2,997,439 issued Aug. 21, 1961; U.S. Pat. No. 3,035,889 issued May 22, 1962; and U.S. Pat. No. 3,097,926 issued July 16, 1963.

In the Stretford process, gaseous hydrogen sulfide is reacted with a solution containing anthraquinone disulfonic acid (ADA) or with a aqueous alkaline solution containing ortho-, meta- and pyrovanadates of ammonia and alkali metals and a salt of iron, copper, manganese, chromium, nickel, or cobalt. The gaseous hydrogen sulfide, which may be only one constituent of a mixture of gases, is then exposed to one of these Stretford solutions where the reaction occurs. Usually, the process utilizes pentavalent vanadium, $V^V$, to oxidize the sulfide ion to elemental sulfur and ADA as a catalyst to enable oxygen to regenerate $V^{IV}$ to $V^V$. The hydrogen sulfide reacts with the solution to release elemental sulfur and reduce the solution. The sulfur-bearing solution then flows to another vessel, where a gas, such as air, containing oxygen bubbles through the reduced Stretford solution to regenerate that solution by oxidizing it. Simultaneously or subsequently, sulfur is separated from the Stretford solution and the solution is recirculated in the process. The regeneration of the Stretford solution and the separation of the elemental sulfur from the Stretford solution usually take place simultaneously with a dispersed air flotation system. At the time of separating the Stretford solution typically contains 0.5 to 2.0 volume percent suspended sulfur.

Dispersed air flotation systems employ a tank having a suspension of particles in a liquid through which large (i.e. 1–20 mm in diameter) air bubbles are allowed to rise. As the bubbles rise through the liquid, the bubbles collide with and adhere to individual particles as well as larger agglomerations of sulfur which are floated to the surface of the Stretford solution due to their increased buoyancy. The froth, which typically contains about 4–8 volume percent elemental sulfur and 92–96% Stretford solution is separated in a conventional manner from the remaining liquid plus unfloated sulfur. To recover the sulfur, the froth enters a melter where it is heated so that the sulfur melts and is separated. The Stretford solution part of the froth then returns to the processing. Unfloated sulfur particles from the flotation tank continue to recirculate through the process until they either settle out in surge tanks or are eventually removed in the flotation tank. In conventional Stretford processes, much of the sulfur (and frequently, most of the sulfur) which enters the oxidizer (flotation tank) is not floated. This is a serious problem and means that much additional solution must be circulated to the melter, where it undergoes thermal degradation.

Dispersed air systems like that used in the Stretford process typically use large bubbles and are commonly used in ore separation for base metals. In ore separation systems, the ore is present in relatively high concentrations (for example 20–30 weight percent) and the large air bubbles are effective at floating the desired mineral particles provided the particles to float are on the order of 20 microns in diameter or greater.

Quite apart from the Stretford process, other flotation techniques are known. For example, a dissolved air separation technique is often used in waste treatment and in water purification processes. In the dissolved air separation technique, pressurized air passes through a pressurized liquid solution until air saturates the solution. The pressurized solution saturated with air then passes through a pressure reducing device in which the pressure acting on the fluid is substantially reduced. The reduction in pressure is accompanied by a simultaneous reduction in air solubility of the liquid. Accordingly, air precipitates out of the liquid solution creating a plurality of very small bubbles, for example, bubbles having a diameter on the order of 100 microns (1 micron = $10^{-6}$ meters) or less. Due to the huge tonnages involved, the dissolved air separation system is not generally used in ore separation processes. Because the volume of air which can be dissolved in water (even under pressure) is quite limited, dissolved air flotation is usually restricted to removing low percentages of contaminants from wastewater, and other similar applications involving the separation of dilute dispersed solids and oils.

Returning to the Stretford process, problems have been experienced with that portion of the process whereby the solid liquid separation takes place and the sulfur is recovered. While the Stretford process provides excellent removal of hydrogen sulfide from the gaseous effluent, the recirculating regenerated Stretford solution frequently has a poor sulfur separation. The poor sulfur separation from the Stretford solution appears to be the result of several problems. Firstly, the sulfur particles themselves are extremely small in size. For example, the elemental sulfur in the Stretford solution frequently has a particle size in the range of 1 to 10 microns. Particles of such fine size experience low settling rates in separation processes. Accordingly, any natural tendency of the particles to separate out of the Stretford solution is resisted by the low settling rate. Hence, sedimentation processes are impractical for sulfur removal from Stretford solution. In addition, in the known Stretford processes the air which regenerates the Stretford solution and effects the sulfur separation uses large bubbles. For example, bubbles with a diameter of several millimeters or larger are common in the Stretford flotation system. Such large bubbles result in poor attachment to the sulfur particles and consequently, very slow flotation rates. Poor bubble-sulfur attachment results from the poor frequency of collision between tiny particles and large bubbles. In essence, most of the tiny particles with their low inertia are swept around the gas bubbles rather than making contact with them.

Besides the flotation separation, the Stretford process also experiences problems due to the low concentration of sulfur particles in the froth. More particularly, the melting unit for sulfur has to be very large to accommodate the high volume of froth. Recognizing that plants using the Stretford process often produce up to 50 tons of sulfur per day, it is clear that the volumetric capacity of the melter must be very large.

In addition, since the froth contains a high volume percentage of Stretford solution, much of the energy used for heating sulfur is wasted in heating the Stretford solution. Not only is the energy wasted but the elevated temperature promotes very harmful degradation of the Stretford solution. At the elevated temperatures in the melter and decanter, the reaction:

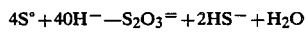

proceeds readily and is the main contributor to solution degradation. Typically the Stretford solution is continuously recirculated as a batch, the batch being as large as 500,000 gallons. Since the batch is replaced when the concentration of $Na_2S_2O_3\text{-}5HO$ reaches 200 to 250 g/l, reducing exposure to this main source of degradation (the heat of the melter) would have the effect of both increasing the useful life of a charge of Stretford solution and improving the performance of the process.

Both solution degradation and melter efficiency can be improved if the sulfur concentration in the froth can be increased substantially.

Thus, it can be seen that the need continues to exist for improvements in the Stretford process that will promote sulfur removal from the Stretford solution, and increase the sulfur content of the froth.

SUMMARY OF THE INVENTION

Recognizing that the separability of the sulfur from the Stretford solution can be enhanced by increasing the size of sulfur particles to be removed, the reduced Stretford solution along with the entrained sulfur particles is treated with a very low concentration of a non-polar hydrocarbon, such as fuel oil or kerosene. This treatment includes an emulsification step in which the hydrocarbon is dispersed throughout the liquid Stretford solution. Since the hydrocarbon is hydrophobic and since the sulfur particles are partially hydrophobic, the hydrocarbon tends to associate with the sulfur particles. In so doing the hydrophilic areas of the sulfur particles are coated by a hydrocarbon film.

After treatment by the kerosene or fuel oil, the Stretford solution is then subjected to a subsequent treatment to enhance particle-bubble attachment. In one embodiment, the Stretford solution and suspended sulfur particles are mechanically treated, such as by a colloid mill. The colloid mill introduces mechanical energy into the Stretford solution and creates many zones of very high shear in the fluid. For example, a typical colloid mill may have many rotary mixers which are separated by static vanes through which the liquid must pass. This mechanical treatment combined with the hydrophobic characteristics of both the sulfur and the hydrocarbon serves to agglomerate the comparatively small sulfur particles into larger coagulations of the sulfur particles. For example the size of the sulfur agglomerations may be on the order of 15 to 100 microns in characteristic dimension. These sulfur agglomerations are considerably larger than the sulfur particles themselves (1-10 microns) and exhibit a remarkably improved ability to collide with bubbles and to adhere to bubbles. Accordingly, the subsequent solid-liquid separation is substantially improved.

A second treatment step for enhancing particle-bubble attachment may be used in conjunction with or in lieu of the first treatment step. The second treatment step involves pressurizing at least a portion of the Stretford solution containing entrained sulfur particles by passing that portion through an air dissolver in which air, under several atmospheres of pressure, is dissolved in the Stretford solution.

Parenthetically it should be noted that this air dissolution step also enhances regeneration of the Stretford solution portion passing through the air dissolver.

Pressure on the Stretford solution containing the sulfur particles and dissolved air is then reduced and the solution is discharged into a flotation tank. The pressure reduction creates a Stretford solution supersaturated with air. In the flotation tank, the solution with supersaturated air mixes with any portion that bypassed the air dissolver and the supersaturated air precipitates out as very small bubbles. Typically, these bubbles have diameters on the order of 100 microns or less.

These very small bubbles tend to nucleate on the hydrophobic sulfur particles thereby obviating particle-bubble collision as a means of attaching particles to bubbles. In addition, the small size of the bubbles enhances the tendency of additional sulfur particles to attach themselves to the bubbles during collisions with the bubbles as they move vertically upward through the solution flotation tank. And finally, the very small size of the bubble substantially increases the number of bubbles available for a given air volume. In addition to separation effected by the precipitating air bubbles, additional air is bubbled through the bottom of the flotation tank. This additional air passes through a sparger to give small bubbles. Alternatively, Stretford solution and aspirated air can be injected into a region near the bottom of the tank. This additional air further enhances the separation process and regenerates any Stretford solution that has not passed through the air dissolving step. When the froth is removed from the flotation tank, it has a sulfur concentration of 15 to 35 volume percent.

As a further improvement on the process, the Stretford solution passes through the flotation tank in a manner specifically designed to further promote separation of the sulfur by the flotation process. More particularly, the Stretford solution is exposed to a high shear flow regime near the bottom of the tank whereas it experiences a low shear flow regime near the top surface. This high shear flow regime is effective to increase the probability that the air bubbles from the precipitation and from the sparger will collide with agglomerated sulfur particles such that adherence occurs therebetween. The low shear flow regime is effective to reduce the probability that sulfur particles that have already collided with and adhered to an air bubble are detached from that bubble by the internal fluid currents.

It has also been found that the process can be substantially improved by using a flotation column in lieu of or in addition to the flotation cell. Such a column advantageously uses the countercurrent flow between settling sulfur particles (or agglomerates) and rising air bubbles to enhance the incidence of bubble-particle collisions. Moreover, the low turbulence levels in such a column materially reduces the probability that existing bubble-particle couples will become separated into bubbles and particles.

BRIEF DESCRIPTION OF THE DRAWINGS

Many objects and advantages of the present invention will be apparent to those skilled in the art when this specification is read in conjunction with the attached drawings wherein like reference numerals have been applied to like elements and wherein.

DESCRIPTION OF THE PREFERRED EMBODIMENTS

Figure 1:
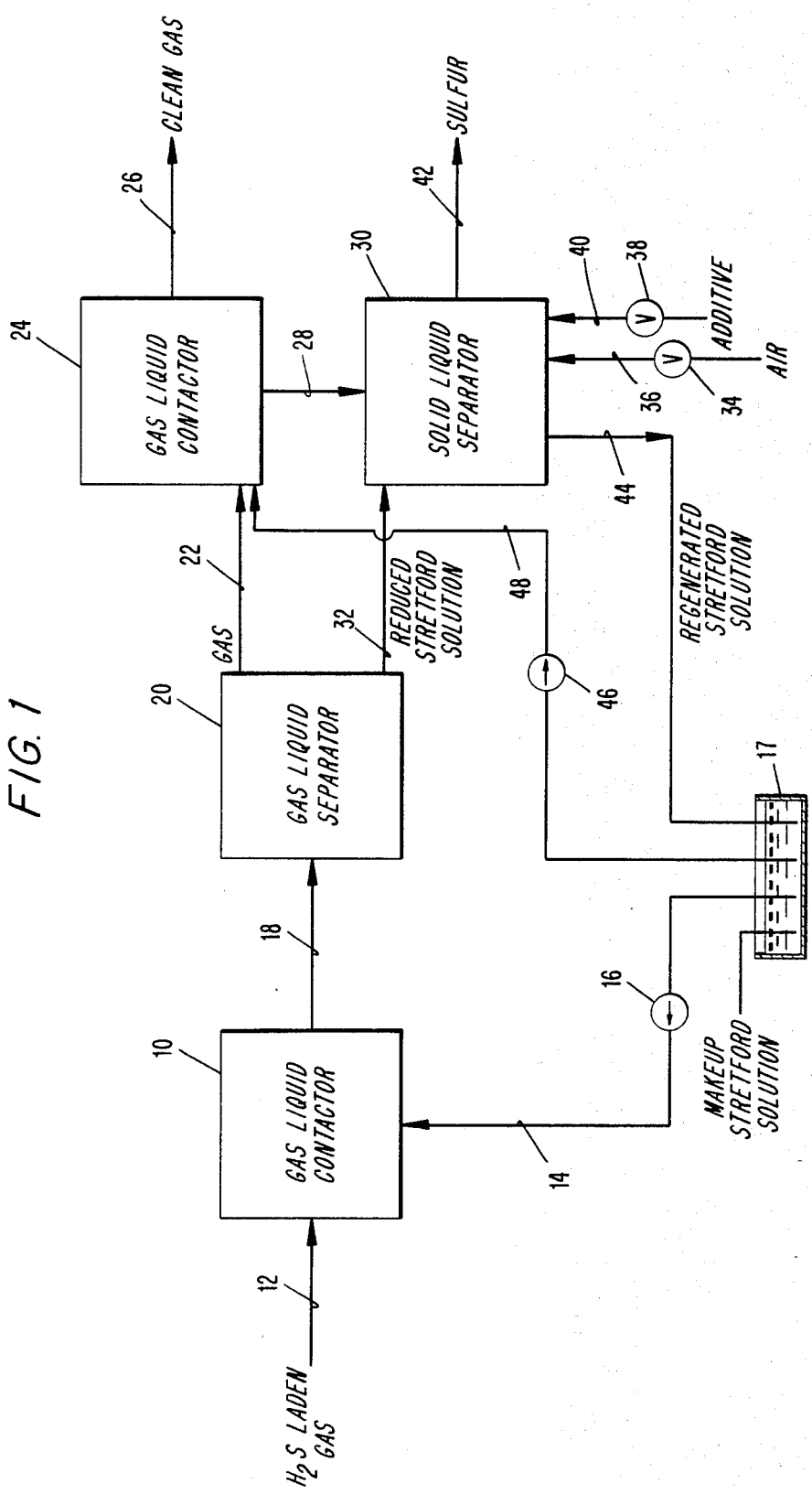
FIG. 1 is a flow diagram of a typical variation of the Stretford process using a solid-liquid separation in accordance with the present invention.

With reference to FIG. 1, a sulfur laden gas enters a gas-liquid contactor 10 through a inlet conduit 12. This sulfur laden gas may, for example, be the tail gas from a petroleum refinery or sour natural gas. Both of these as gases, as well as any other gas having a high hydrogen sulfide content, may be treated by the Stretford process in order to remove the noxious hydrogen sulfide gas, to manufacture sulfur and to comply with environmental regulations.

In the gas-liquid contactor 10, the hydrogen sulfide laden gas is thoroughly mixed with a liquid Stretford solution which is introduced into the contactor 10 through a second inlet 14. Conventionally, the gas-liquid contactor 10 comprises a venturi scrubber through which the hydrogen sulfide laden gas passes and into which the liquid Stretford solution is sprayed so as to provide intimate gas-liquid contact therebetween.

Generally, the Stretford solution is recirculated to the gas liquid contactor 10 from downstream parts of the process. In the course of continuous operation, it will be appreciated that from time to time it may be necessary to add additional Stretford solution. Such additional solution may be added directly to a balance basin 17 which communicates with the recirculation loop.

As used in this specification, the phrase liquid Stretford solution is a reference to any of the anthraquinone disulphonic acid solutions, any of the aqueous alkaline solutions of ortho-,meta- and pyrovanadates of ammonia and alkali metals, with a metal salt of iron, copper, manganese, chromium, nickel and cobalt as well as a sequestering agent.

In the gas-liquid contactor 10, the liquid Stretford solution reacts with a hydrogen sulfide in the gas. During this reaction, the Stretford solution is reduced while the hydrogen sulfide gas is oxidized to liberate elemental sulfur. The elemental sulfur released during the reaction is suspended in the liquid Stretford solution. During the gas-liquid contacting which takes place in the contactor 10 up to 95% of the hydrogen sulfide in the incoming gas stream reacts with the Stretford solution.

The effluent 18 from the gas-liquid contactor 10 is basically a three phase flow comprising the gas, the Stretford solution and the solid elemental sulfur suspended in the liquid. This three phase mixture is then introduced into a gas-liquid separator 20 in which the gas phase is separated from both the liquid Stretford solution and the elemental sulfur.

The gaseous part of the flow from the gas-liquid separator 20 passes through a conduit 22 into a second gas-liquid contactor stage 24. In the second gas-liquid contactor 24, the gas is again exposed to Stretford solution, typically in a countercurrent relationship. The second exposure to the Stretford solution also reduces the Stretford solution while oxidizing the hydrogen sulfide to get sulfur in its elemental state. As a result the remaining portions of the gaseous hydrogen sulfide are removed from the gas in the second liquid contactor 2 so that the effluent 26 of the gas-liquid contactor 24 is essentially free of hydrogen sulfide gas. The second gas liquid contactor 24 may, for example, comprise a conventional counterflow absorbing column.

The liquid effluent from the gas-liquid contactor 24 along with the elemental sulfur drains through an outlet 28 of gas-liquid contactor 24 into a solid-liquid separator 30. The solid liquid separator 30 also receives, as input, the reduced Stretford solution passing through conduit 32 from the first gas-liquid separator stage 20.

In the solid-liquid separator 30, the reduced Stretford solution from the gas-liquid separator 20 and from the second contactor 24 are regenerated by bubbling metered quantities of air through the liquid Stretford solution. Toward this end, a valve 34 regulates the quantity of air which can be admitted to the solid-liquid separator 30 through the conduit 36. In addition, a valve 38 which regulates the flow through a conduit 40 may also be provided to control the quantities of additive introduced into the solid-liquid separating process. In FIG. 1 the additive is schematically shown as being introduced directly into the solid-liquid separator 30. Alternatively, or in addition, the additive may be introduced into the conduit 32 upstream of the solid-liquid separator 30. As will be described more fully hereinafter suitable additives are non-polar hydrocarbons, such as, for example, kerosene, No. 4 fuel oil, decane, hexane, dodecane and other petroleum fractions. Low application rates, in the range of 1 to 20 ppm, are suitable for these additives.

In the solid-liquid separation process, the Stretford solution is regenerated by an oxidation reaction with air introduced through the conduit 36. Moreover, the air bubbling through the Stretford liquid floats elemental sulfur to the surface from which it is collected and removed as a slurry 42 and subsequently the solid sulfur is recovered as a byproduct.

Regenerated Stretford solution leaves the solid-liquid separating process through a conduit 44 which communicates with the balance basin 17. A pump 16 supplies the liquid Stretford solution to the first gas-liquid contactor 10. In addition, Stretford solution from the balance basis 17 may be pumped through a conduit 48 by a pump 46. The conduit 48 supplies Stretford solution to the second gas-liquid contactor 24. The pump 46 effectively regulates the portion of regenerated Stretford solution supplied to the second gas-liquid contactor 24.

Figure 2:
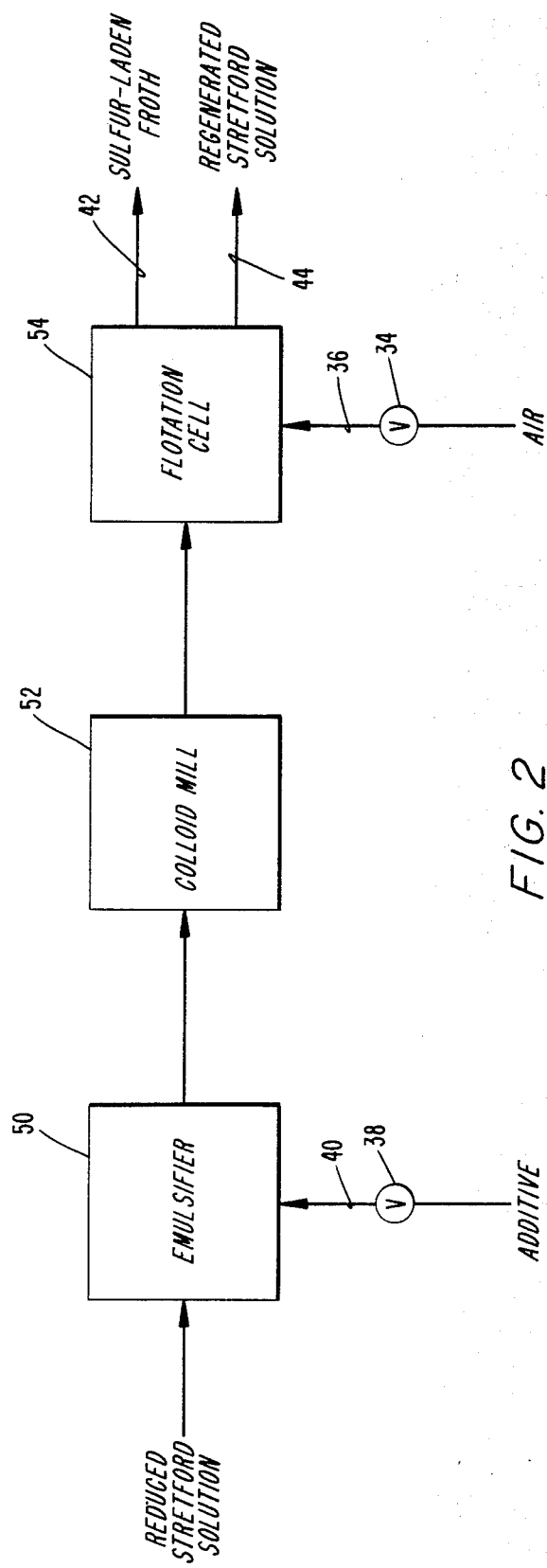
FIG. 2 is a process diagram of a first embodiment of the present invention.

Details of the solid-liquid separation process in accordance with the present invention will now be described more fully. More particularly, with reference to FIG. 2, the reduced Stretford solution containing suspended elemental sulfur is preferably introduced to an emulsifier 50 where it is mixed with an additive that is introduced through the conduit 40. The additive is preferably selected from the group consisting of non-polar hydrocarbons and is introduced into the emulsifier at a rate of 1 to 20 ppm based on the total liquid plus solid. The emulsifier 50 itself is a suitable conventional device such as a jet emulsifier which creates a high shear fluid flow in which the additive metered by the valve 38 is dispersed in suspension throughout the Stretford solution.

After the emulsification step, the emulsified Stretford solution is treated to enhance particle-bubble attachment. In the preferred embodiment, the Stretford solution is introduced into a suitable conventional colloid mill 52. Mechanical energy is added to the colloid mill to create many zones very high shear fluid flow therein through which the Stretford solution and the suspended sulfur particles must pass. In the colloid mill, the multitude of high shear zones may be created by a plurality of rapidly rotating paddles moving between stationary vanes. As the suspended sulfur particles enter the solid-liquid separation, they have a diameter ranges in size from 1 to 10 microns. The colloid mill coagulates the sulfur particles and the additive into agglomerations of those particles that may have characteristic dimensions in the neighborhood of 20 to 60 microns. The effluent from the colloid mill 52 is then introduced into a flotation cell 54. It may be possible to use either an emulsifier or a colloid mill (rather than both) as long as sufficient high shear and residence time is provided before the flotation cell. This depends on the particular plant. In the flotation cell 54, the Stretford solution is regenerated by oxidation and the agglomerated sulfur laden froth is floated and removed. The froth is then heated to melt the sulfur and the Stretford solution of the froth is returned to the process. The additive need not be removed from the sulfur since it is present in such small quantities that it does not constitute a significant impurity.

In the flotation cell, air metered by the valve 34 passed upwardly through the Stretford solution in the cell 54. Preferably, the air is introduced into the bottom of the flotation cell through a sparger plate which may comprise a porous plate having small openings so that the resulting bubble diameter is in the neighborhood of 100 microns. As the small bubbles collide with the sulfur particle agglomerates, the sulfur agglomerates adhere to the air bubble thereby increasing the buoyancy of the agglomerates. With the increased buoyancy, the agglomerates promptly float to the surface of the flotation cell 54 from which they may be mechanically removed through the channel 42 in a conventionally known fashion as a sulfur laden froth.

Simultaneously, some of the air which is introduced to the conduit 36 reacts with the reduced Stretford solution and oxidizes that solution. The small bubble diameter increases the surface area of air which contacts the liquid thus reducing the volume of air needed to oxidize the Stretford solution. The oxidation, or regeneration, of the Stretford solution is essentially completed during its residence time in the flotation cell.

Alternatively, air which has been aspirated into solution may be fed into the bottom of the cell via a distributor plate.

The flotation cell also has some additional characteristics that are influential on the efficacy of the process. More particularly, the lower portion of the flotation cell is arranged and constructed so that the flow of the reduced Stretford solution therethrough takes place in a relatively high shear flow regime. With this flow regime, the regeneration of the Stretford solution is enhanced. Moreover the probability that air bubbles will collide with and adhere to the suspended sulfur agglomerations is increased. Another aspect of the flotation cell design is that the upper portion of the flotation cell is designed so that a comparatively low shear flow regime exists. This low shear flow regime is important because the absence of fluid shear substantially reduces the probability that the sulfur agglomerations will be dislodged from bubbles to which they have adhered thereby promoting floating of those agglomerations to the surface.

Figure 3:
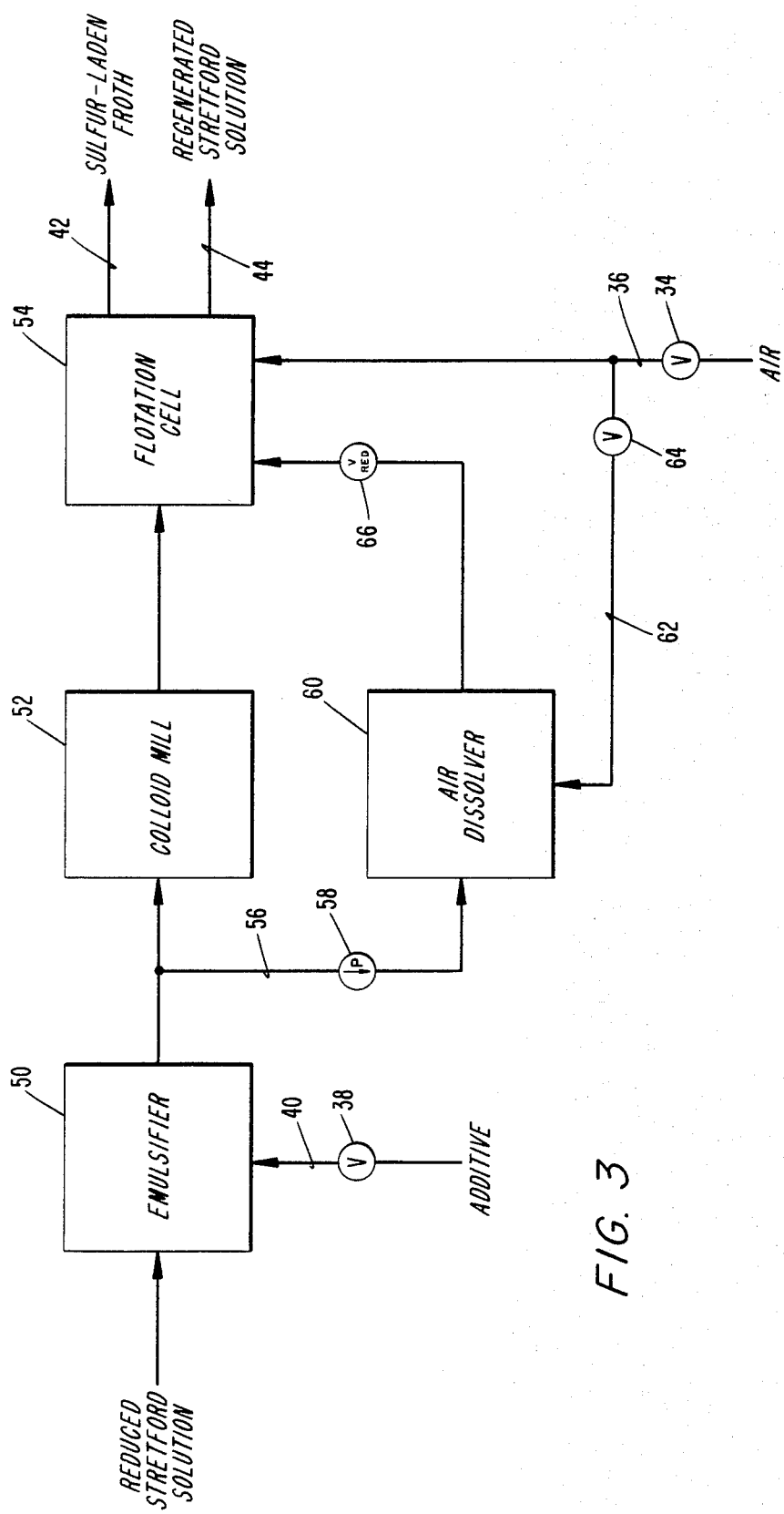
FIG. 3 is a process diagram of a second embodiment of the present invention.

A modification of the solid-liquid separation process is illustrated in greater detail in FIG. 3. A portion of the emulsified, reduced Stretford solution is diverted upstream of the colloid mill 52. The solution passes through a conduit 56 which includes a pump 58 that pressurizes the reduced Stretford solution to 3 to 5 atmospheres (i.e., 45 to 75 psi). Preferably, 5 to 40 percent of the volumetric flow of reduced Stretford solution through the emulsifier 50 is withdrawn via the conduit 56 while the remaining portion of the reduced Stretford solution flows into the colloid mill 52. The diverted Stretford solution enters an air dissolver 60 where the reduced Stretford solution has pressurized air bubbled therethrough. The solution is sprayed through the vapor space of the dissolver to enhance air dissolution. Air enters at a pressure of 3 to 5 atmospheres through, for example, a sparger plate. To deliver the air to the air dissolver 60, the air conduit 36 is provided with a branch 62 having a valve 64 which regulates the portion of the air removed from the conduit 36 and used for the air dissolver 60. The air in the conduit 62 is pressurized if it has insufficient pressure to be used in the air dissolver 60. In addition, the air is introduced into the bottom of the air dissolver and flows crosswise through the reduced Stretford solution.

The flow rate of the air through the conduit 62 is regulated in relation to the flow of reduced Stretford solution through the branch conduit 56 so that as the Stretford solution leaves the air dissolver, it has been saturated with dissolved air. The regenerated Stretford solution with saturated air then passes through a suitable conventional pressure reducing valve 66 just before its introduction into the flotation cell 54, described above. The reducing valve lowers the pressure of the diverted portion to the operating pressure of the process.

In the flotation cell 54, the air saturated regenerated Stretford solution mixes with the reduced Stretford solution flowing into the flotation cell 54 from the colloid mill 52. In the flotation cell 54, the air from conduit 36 functions in the same manner as described above in connection with the embodiment of FIG. 2. Moreover, the supersaturated air in that portion of the Stretford solution passing through the air dissolver 60 begins to precipitate when exposed to the lower pressure prevailing in the flotation cell. Accordingly, a portion of the dissolved air precipitates out of the solution as very small bubbles having a diameter generally less than 100 microns in size. These very small air bubbles not only enhance the regeneration of Stretford solution not already regenerated but also provide a much greater number of bubbles which may collide with the agglomerated sulfur particles so as to float those particles to the surface of the flotation cell.

According to the next embodiment of the present invention, the colloid mill 52 may be completely eliminated from the solid-liquid separation process. Thus, all of the components illustrated in FIG. 4 perform in the same fashion as those described in connection with FIG. 3. The primary difference being that much of the regeneration of the Stretford solution takes place in the air dissolver 60 rather in the flotation cell 54.

In the preferred embodiment of the invention (see FIG. 5), the effluent of the colloid mill 52 is introduced into a suitable flotation column 70. The flotation column 70 has a length to diameter ratio of at least 3:1 with the colloid mill effluent being introduced between the ends of the column 70. At the top of the flotation column 70, a froth overflow collector ring 72 is provided to deliver sulfur laden froth to a conduit 74. At the bottom of the column 70, a diffuser plate 78 is provided which bubbles air or other oxygen containing gas upwardly through the column 70. Air is supplied to the bottom of the column through a conduit 82 with the flow rate being regulated by a suitable conventional valve 80. Alternatively, aspirated air and solution can be supplied to the bottom of the column 70.

The Stretford solution is removed from the flotation column 70 through the conduit 76. As the Stretford solution passes through the flotation column 70, it is in counterflow relationship to the air introduced through at the bottom. That countercurrent flow relationship involves no moving parts yet enhances the probability of collision between sulfur particles that are falling and air bubbles that are rising through the column 70. Moreover, since turbulence in the column is low in comparison to a flotation cell, the probability that bubble-particle couples are separated into bubbles and particles is materially reduced. In this embodiment, the Stretford solution is also regenerated by the flotation column 70.

In a slightly modified embodiment, (see FIG. 6), the flotation column 70 is supplied with the effluent of a flotation cell 54 comprising the regenerated Stretford solution. Here, the flotation column 70 further separates additional elemental sulfur from the Stretford solution. Froth effluent from the column 70 is combined with froth effluent from the flotation cell 54 and passed to a suitable conventional melter 84 where the sulfur is removed and Stretford solution is obtained for recirculation. The air flowrate to the cell 54 could be reduced to as little as one-fifth of what is conventionally practiced. Also this embodiment may be efficient and more cost effective if the colloid mill 52 is eliminated. In all other respects, the flotation column 70 is the same as described above in connection with FIG. 5.

Figure 4:
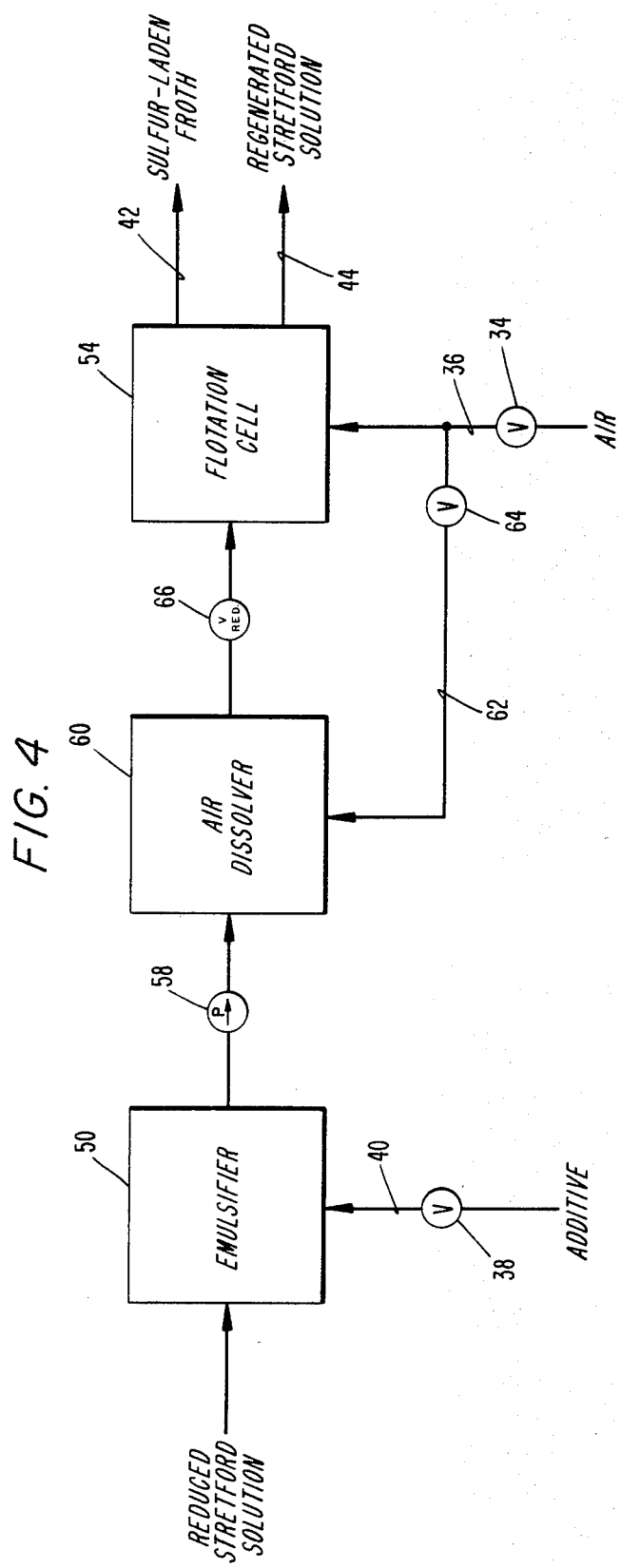
FIG. 4 is a process diagram of a third embodiment of the present invention.
Figure 5:
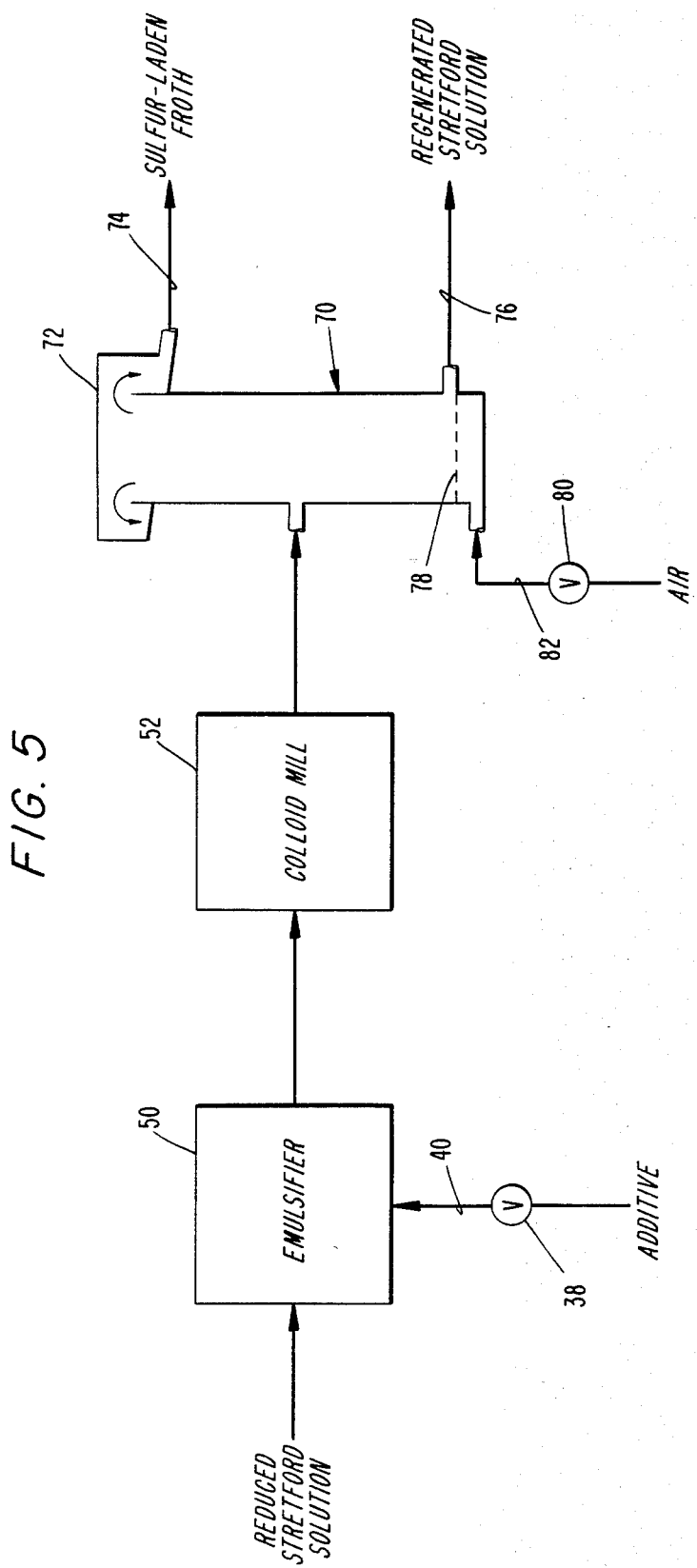
FIG. 5 is a process diagram of the first embodiment using a flotation column in place of a flotation cell.
Figure 6:
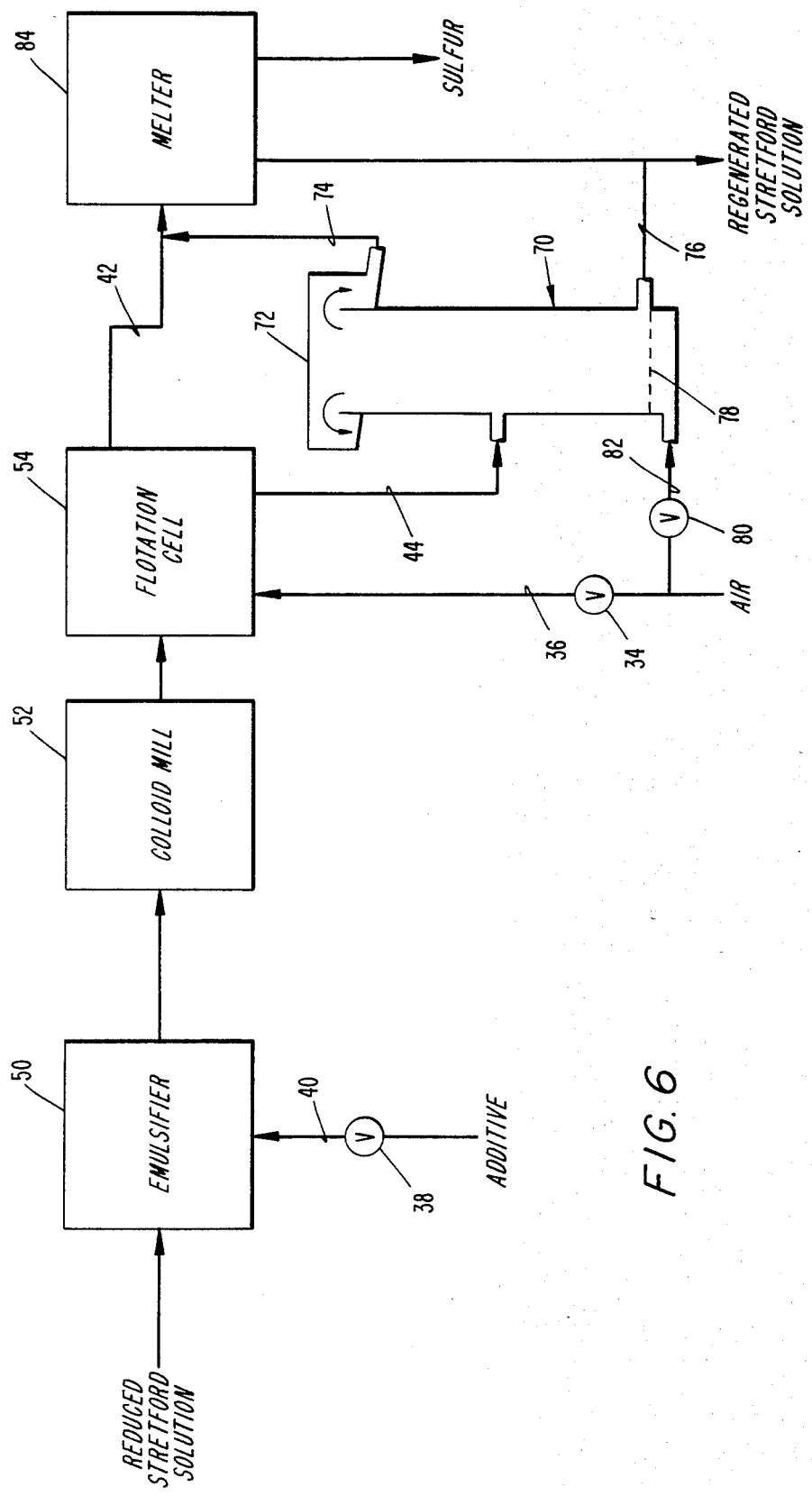
FIG. 6 is a process diagram of the first embodiment using a flotation column in addition to a flotation cell.

It will, moreover, be appreciated that the flotation column 70 as illustrated in FIGS. 5 and 6 can be substituted for the flotation cell 54 in FIGS. 3 and 4 or used in addition thereto.

Several tests were made to evaluate the foregoing processes against typical performance of a Stretford system. Table 1 summarizes the comparison in volume percentages.

EXAMPLE I

Example I represents typical plant performance at an operating Stretford plant recovering 3 to 5 tons of sulfur per day. In that plant, diesel fuel is injected into the line feeding an oxidizer tank (flotation cell) at the rate of 2 ppm.

EXAMPLES II AND III

In these laboratory scale tests, a quantity of reduced Stretford solution from the plant of Example I was introduced into the middle of a flotation column at a rate of 90 cc per minute. The flotation column had a length to diameter ratio of about 10:1. Air was introduced into the bottom of the column and the solution was removed adjacent the bottom. Froth was collected from the top of the column and sulfur contents were measured as in Example I. The airflow for Example III was approximately 20% greater than for Example II. The results of these tests are tabulated in Table 1.

EXAMPLES IV AND V

These tests were similar in all respects to Examples II and III, respectively, except that air at 50-60 psi was dissolved in the Stretford solution before that solution was fed to the flotation column. The results of these tests are tabulated in Table 1.

EXAMPLE VI

This test was similar in all respects to Examples II and III except that diesel fuel at the rate of 2 ppm was pre-emulsified in the Stretford solution using a high shear device. The results of this test are tabulated in Table 1.

EXAMPLE VII

This test was similar in all respects to Example VI except that air at 50-60 psi was also dissolved in the feed to the flotation column. The results of this test are tabulated in Table 1.

TABLE 1

| | Stretford Sulfur Removal | | | |
|---|---|---|---|---|
| | Sulfur in Feed, % | Sulfur in Effluent, % | Sulfur in Froth, % | Sulfur Removal % |
| Example 1 | 0.89 | 0.80 | 5.0 | 11 |
| Example II | 0.87 | 0.46 | 26.6 | 48 |
| Example III | 0.84 | 0.36 | 20.7 | 58 |
| Example IV | 0.87 | 0.39 | 23.8 | 56 |
| Example V | 0.84 | 0.32 | 22.7 | 63 |
| Example VI | 0.80 | 0.19 | 19.5 | 77 |
| Example VII | 0.80 | 0.14 | 17.2 | 84 |

From the foregoing table, it will be quickly seen that use of the flotation column in place of the flotation cell results in a fourfold increase in sulfur removal. Moreover, the use of dissolved air in the feed to the flotation column results in 5-6 times the sulfur removal obtained from a flotation cell. When a non-polar hydrocarbon is emulsified in the feed to the column, sulfur removal improves by a factor of 7. And where both dissolved air and non-polar hydrocarbon are used in conjunction with the flotation column sulfur removal improves by a factor in excess of 7.5.

It should now be apparent that in accordance with the present invention a process has been described which substantially improves the recoverability of elemental sulfur from Stretford solutions and improves longevity of Stretford solution. Moreover, it would be apparent to those skilled in the art that numerous modifications, variations, substitutions and equivalents exist for various features of the invention that do not materially depart from the spirit of the scope of this invention. Accordingly, it is expressly intended that all such modifications, variations, substitutions and equivalents for the various features of the present invention which do not materially depart from the spirit and scope of the invention be embraced by the appended claims.

What is claimed is:

1. A method of extracting sulfur from gas containing hydrogen sulfide comprising the steps of:
   contacting the gas with a liquid Stretford solution which reacts with the hydrogen sulfide to produce elemental sulfur;
   separating the liquid solution containing suspended elemental sulfur from the gas;
   adding a non-polar hydrocarbon to the Stretford liquid;
   emulsifying the non-polar hydrocarbon and the Stretford liquid solution;
   enhancing particle-bubble attachment properties of the liquid solution by agglomerating the suspended elemental sulfur by flowing the emulsified liquid Stretford solution through a colloid mill;
   passing air through the liquid solution to regenerate that solution and float suspended sulfur to the top of that solution; and
   removing the floated sulfur from the solution.

2. The extraction method of claim 1 wherein the step of adding a non-polar hydrocarbon includes:
   adding to the liquid solution 1 to 20 ppm of kerosene before the attachment enhancement step; and
   wherein the emulsifying step operates on the kerosene and liquid solution before the attachment enhancement step.

3. The extraction method of claim 1 wherein the step of adding a non-polar hydrocarbon includes:
   adding to the liquid solution 1 to 20 ppm of fuel oil before the attachment enhancement step; and
   wherein the emulsifying step operates on the fuel oil and liquid solution before the attachment enhancement step.

4. The extraction method of claim 1 including the steps of:
   adding a soluble gas selected from the group consisting of air and oxygen to from 5 to 40 volume percent of the separated liquid solution at a pressure elevated above atmospheric pressure to create a solution essentially saturated with soluble gas; and
   reducing the elevated pressure of that liquid solution to atmospheric pressure and mixing the gas saturated liquid solution with the remaining 60 to 95 volume percent of the liquid solution so that nucleation of the soluble gas floats the suspended sulfur to the surface of the liquid solution.

5. The extraction method of claim 4 wherein the adding step includes adding air as the soluble gas.

* * * * *